US008649301B2

(12) United States Patent  
Kihlberg

(10) Patent No.: US 8,649,301 B2  
(45) Date of Patent: Feb. 11, 2014

(54) CHANNEL ALLOCATION IN DECT TELECOMMUNICATION SYSTEMS

(75) Inventor: Roger Kihlberg, Värnamo (SE)

(73) Assignee: 3M Svenska AB, Sollentuna (SE)

( * ) Notice: Subject to any disclaimer, the term of this patent is extended or adjusted under 35 U.S.C. 154(b) by 222 days.

(21) Appl. No.: 12/811,438

(22) PCT Filed: Nov. 24, 2008

(86) PCT No.: PCT/SE2008/000655  
§ 371 (c)(1),  
(2), (4) Date: Jul. 1, 2010

(87) PCT Pub. No.: WO2009/088324  
PCT Pub. Date: Jul. 16, 2009

(65) Prior Publication Data  
US 2010/0284361 A1    Nov. 11, 2010

(30) Foreign Application Priority Data  
Jan. 7, 2008   (SE) ..................... 080037-4

(51) Int. Cl.  
*H04L 12/16* (2006.01)

(52) U.S. Cl.  
USPC ........... 370/263; 370/326; 370/329; 370/345; 370/498

(58) Field of Classification Search  
None  
See application file for complete search history.

(56) References Cited

U.S. PATENT DOCUMENTS

| 4,718,109 A | 1/1988 | Breeden et al. |
| 5,404,575 A | 4/1995 | Lehto |
| 6,005,848 A * | 12/1999 | Grube et al. ................ 370/266 |
| 6,161,016 A * | 12/2000 | Yarwood ..................... 455/445 |
| 6,353,605 B1 * | 3/2002 | Rautanen et al. ............. 370/337 |
| 6,449,484 B1 * | 9/2002 | Grubeck et al. .............. 455/450 |
| 7,319,686 B1 * | 1/2008 | Lu et al. ...................... 370/338 |
| 7,379,430 B2 * | 5/2008 | Duplessis et al. ............ 370/281 |
| 7,656,962 B2 | 2/2010 | Halfmann |
| 2002/0119792 A1 | 8/2002 | Silvestri |
| 2002/0159409 A1 | 10/2002 | Wolfe et al. |
| 2004/0082349 A1 * | 4/2004 | Pinault ........................ 455/502 |
| 2005/0037728 A1 * | 2/2005 | Binzel et al. .............. 455/404.1 |
| 2006/0099983 A1 | 5/2006 | Kim |
| 2007/0146127 A1 | 6/2007 | Stilp et al. |
| 2007/0225004 A1 * | 9/2007 | Tang et al. ................... 455/450 |
| 2009/0238152 A1 * | 9/2009 | Hans et al. ................... 370/335 |

FOREIGN PATENT DOCUMENTS

| EP | 1868301 A2 | 12/2007 |
| WO | WO 2005/101695 A1 | 10/2005 |
| WO | WO 2008/002436 A2 | 1/2008 |

OTHER PUBLICATIONS

DECT Forum, *DECT The Standard Explained*, Feb. 1997.  
Public Safety Wireless Network (PSWN), *Comparison of Conventional and Trunked Systems*, 1999.

* cited by examiner

*Primary Examiner* — Faruk Hamza  
*Assistant Examiner* — Tito Pham  
(74) *Attorney, Agent, or Firm* — Melanie G. Gover

(57) ABSTRACT

A method for wireless digital radio communication is put into effect on a first number K of channels between a second number A of users. All A of the users are permitted to listen on one and the same listening channel. A limited number B of channels is used for outgoing speech communication. The communication on these channels is transmitted to all A users on the listening channel. A communication apparatus which utilizes this method includes at least one stationary base unit (1) and at least A handsets (2).

7 Claims, 3 Drawing Sheets

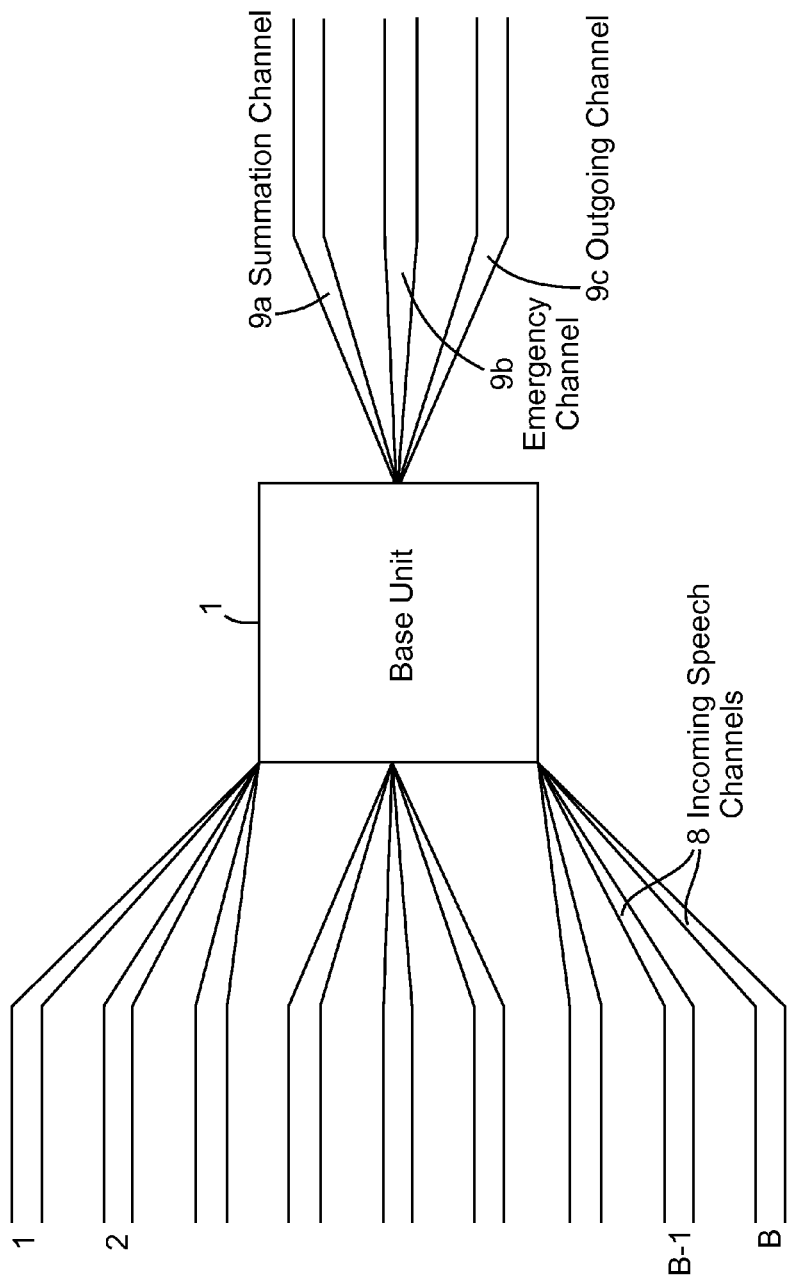

CHANNEL ALLOCATION IN DECT TELECOMMUNICATION SYSTEMS

CROSS REFERENCE TO RELATED APPLICATIONS

This application is a national stage filing under 35 U.S.C. §371 of PCT/SE2008/000655, filed Nov. 24, 2008, which claims priority to Swedish Application No. 0800037-4, filed Jan. 7, 2008, the disclosure of which is incorporated by reference in its/their entirety herein.

TECHNICAL FIELD

The present invention relates to a method for wireless, digital radio communication on a first number K of channels between a second number A of users.

The present invention also relates to a communication apparatus.

BACKGROUND ART

Wireless telephones may be employed in many different practical applications. For example, they occur in the home in order to circumvent the restriction involved in a cord to the telephone receiver. They also occur within industry and in military applications. In the two latter cases, it is a common occurrence that several people each have their communication unit or handset which are all hooked up to the same base unit, which makes for conversations between those persons having a handset.

One standard employed for wireless telecommunication is DECT (Digital Enhanced Cordless Telecommunications). This standard was set up in 1992 and since then has been revised on numerous occasions. The range of this system is approx. 50 m indoors and approx. 300 m outdoors. The DECT system operates with ten ms long time windows, which in turn are divided into 24 time slots, i.e. shorter, well defined time intervals. Half of these may be utilised for transmitting and half for receiving. The system also utilises ten different frequencies, and together this may be said to build up a system with a maximum of 120 channels. In practice, the different frequencies are employed for a "frequency shopping" which is determined by the system, so that those frequencies that momentarily enjoy the best reception conditions are used first. As a result, in reality there are twelve different channels, which implies that hitherto it has been possible to hook-up a maximum of twelve handsets to one and the same base station, which functions as the nerve centre of the system. The base unit checks in rapid sequence each one of the channels and retransmits possible signals to all of the other channels to which a handset is hooked up. The existing system operates per se satisfactorily, and is well-rehearsed to be integrated in, for example, hearing protection and is ideally utilised for communication within small groups. The present system of operation by utilising the standard however entails certain drawbacks. The modus operandi requires considerable energy, since the base station transmits identical signals up to twelve times. This may be a drawback which is particularly severe when the base station is battery powered.

Since a maximum of twelve handsets can be used together with each base station, the size of the groups that can communicate with one another freely within the group is limited.

Problem Structure

The present invention has for its object to strive, within the framework of the existing standard, to develop the prior art technology so that a greater number of handsets can be hooked up to one and the same base station, at the same time as the energy consumption of the system is reduced.

Solution

The objects forming the basis of the present invention will be attained if the method intimated by way of introduction is characterised in that all A users are permitted to listen on one and the same listen channel, while the limited number B of channels is utilised for outgoing voice communication which is transmitted to all A users on the listen channel.

Concerning the communication apparatus, the objects of the present invention will be attained if it utilises the method according to the foregoing disclosure and includes at least one stationary base unit and at least a number A of handsets.

BRIEF DESCRIPTION OF THE ACCOMPANYING DRAWINGS

The present invention will now be described in greater detail hereinbelow with reference to the accompanying Drawings. In the accompanying Drawings:

FIG. 3 is a skeleton diagram of the channels included in the system.

DESCRIPTION OF PREFERRED EMBODIMENT

Figure 1:
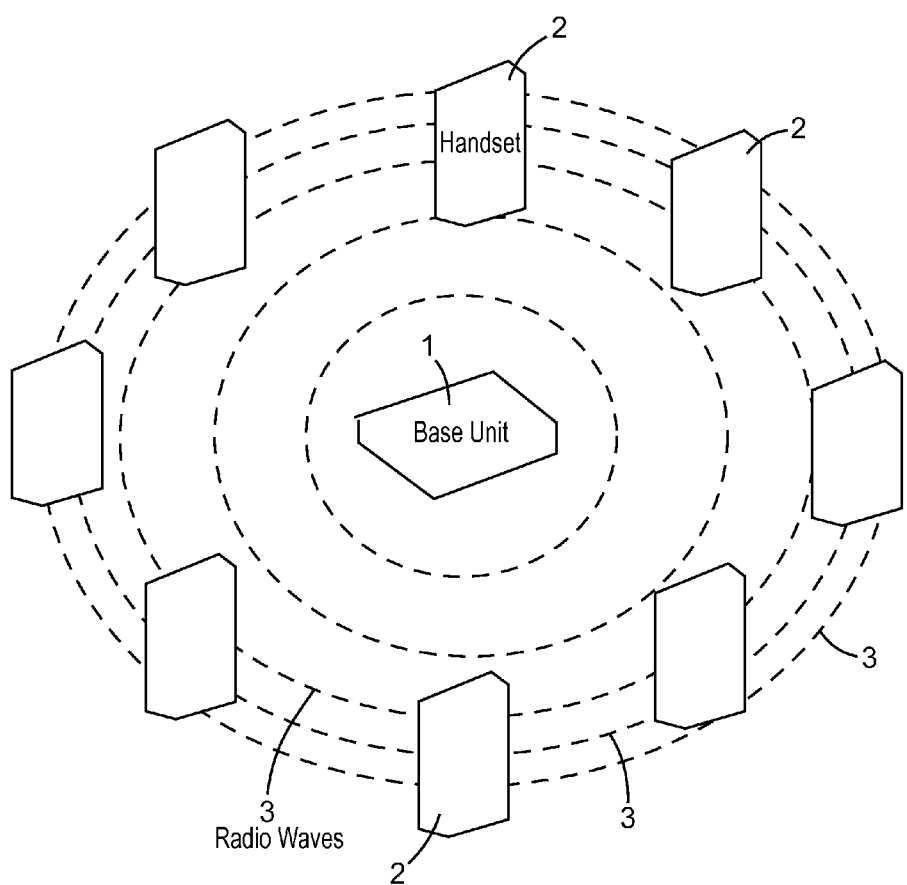
FIG. 1 is a sketch of the system comprising a base unit and a number of handsets.

FIG. 1 shows a schematic diagram of a communication system according to the present invention, which utilises the DECT standard. The system comprises a base unit 1 and a number of handsets 2. The base unit 1 and the handsets 2 communicate with one another via radio waves 3 which move in a direction from both the base unit 1 to the handsets 2 and vice versa. According to DECT standard EN300175, the radio waves use ten different frequencies in the frequency band of 1880 to 1900 MHz. While the apparatus and the method according to the present invention are novel, they are nevertheless still compatible with the extant DECT standard. In the same way as the number of frequencies and the frequency band correspond to the standard, the system also utilises time windows which are 10 ms in length, and where twelve time slots in each time window are used, either for transmission and twelve time slots are used for receiving. In total, the number K of channels is twelve.

The novel feature in the system and the method according to the present invention is that all of the handsets 2 which are hooked up to the base unit 1 listen to one and the same channel instead of each having its own listening channel, as was previously the case. For outgoing communication from the handsets 2, i.e. when the user of the handset 2 wishes to transmit speech, there is no fixed channel allocated to each handset 2 for this purpose. Instead, a number B of speech channels is allocated to the users as needed. When the system is started up, the first user is given a first channel, the second user a second channel, and so on until all of the available speech channels, B in number, have been allocated. In the preferred embodiment, this relates to nine different speech channels. When an additional user, i.e. number B+1, wishes to use a speech channel, that user who has a speech channel, but who has been inactive for the longest time, will forfeit his speech channel. This is instead allocated to the new speaker. The user who has been inactive and forfeit his speech channel can, however, still listen to all communication on the shared listen channel, and at any time he wishes to utilise a speech channel, he will be allocated such a channel, in which event another user who at that, later, point in time has been inactive for the longest period forfeits his speech channel.

Even though in principle this is a matter of prior art technology according to the DECT standard, the structure of the channels in the system will now be described for the sake of completeness.

Figure 2A:
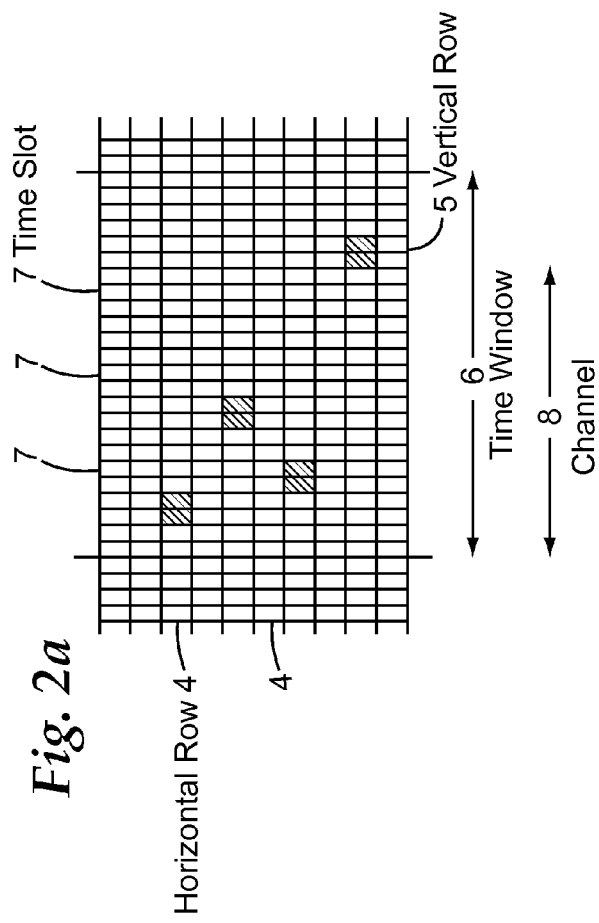
FIG. 2a is a skeleton diagram of time windows and frequencies.

FIG. 2a is a diagram of how the system realises a time window 6 which is divided into a number of time slots 7, transmission taking place on different frequencies. The frequencies correspond to the horizontal rows 4 in the diagram, and are, in the preferred embodiment, ten in number. A series of time slots, which can be utilised for information transmission in digital form, e.g. sound, corresponds to the vertical rows 5. In one preferred embodiment, the time slots 7 are twelve in number, and one time window 6 is 10 ms in length. In FIG. 2a are shown the twelve time slots 7 which are utilised as channels for transmission and thereafter the twelve time slots 7 which are used for reception. The 10 ms long time windows 6 are repeated after one another, and it should be observed that even if a time slot 7, which represents one channel, only takes up a fraction of the total length of the time window 6, and therefore will be extremely short, digital information, for example digitally stored sound, can be transmitted extremely compactly in such a channel. Thus, the sound quality of the sound sampled during a longer time than the length of the time slot 7 will be very good.

A time window 6 is 10 ms long and contains twelve time slots 7 for transmitting or receiving. The system itself jumps between the different frequencies according to the predetermined standard, in such a manner that those frequencies which at that time enjoy the best transmission conditions are used. Thus, the user need not individually make any active frequency adjustment, it being sufficient that the handset 2 is registered at the base station 1.

Unlike the frequencies, the allocated time slot 7 will remain with one and the same user during a long period of time, since a time slot 7 corresponds to one and the same channel. It is only when all channels have been allocated to users and an additional user wishes to utilise a channel for speech that the user who has been inactive during the longest period of time forfeits his channel and can only listen on the shared summation channel.

Figure 2B:
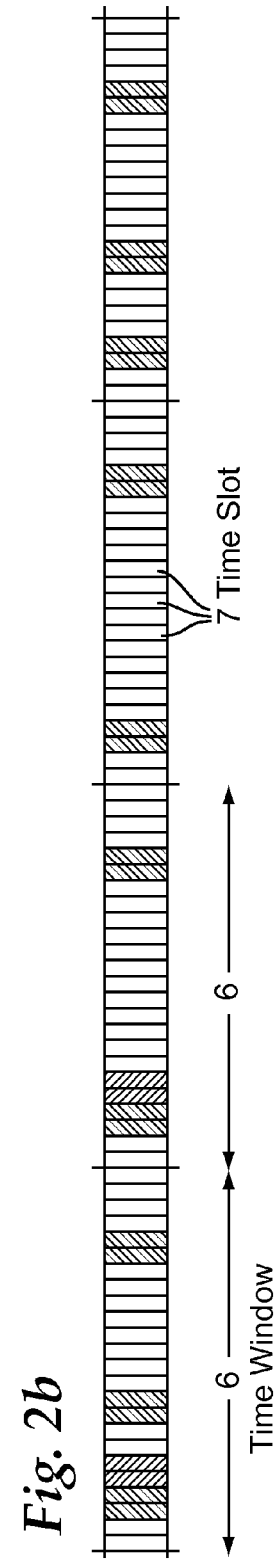
FIG. 2b is a diagram illustrating a sequence of time windows.

FIG. 2b shows a schematic illustration of a number of time windows 6 in sequence after one another. Each time window 6 contains a number of time slots 7 which each correspond to a channel. Since the system itself keeps track of the frequency changes, in FIG. 2b the frequencies have been disregarded.

Each time slot 7 constantly corresponds to the same channel, and in FIG. 2b, the second time slot 7 from the left in each time window 6 corresponds to an inactive channel. The third time slot 7 from the left in each time window 6 corresponds to a conversation that has been completed after three time windows 6. The fifth time slot 7 from the left has, in the first two time windows 6, a content, while it is silent on the corresponding channel during the third and fourth time windows 6.

FIG. 3 shows a functional diagram of the channels 8, 9a, 9b, 9c which are available for transmitting speech to a base unit 1 and the outgoing channels 9a, 9b, 9c which include int. al. the summation channel 9a and the emergency channel 9b. In the sketch in FIG. 3, the structure of the system on the time window level is disregarded, and concentration is centred around how a user perceives the system.

The incoming speech channels 8 are, in the preferred embodiment, nine in number and they can be used by nine different users simultaneously. The base unit 1 sum totals the input signals, i.e. the speech on the incoming channels 8, and transmits the sum totaled signal on a single channel 9a which is listened to by all users in the system, i.e. not only those users who at any moment in time have access to a speech channel 8. The shared listening channel 9a is also entitled summation channel or conference channel, respectively. Since the transmission from the base unit 1 takes place on only one channel instead of to the channel of each respective user, the transmission according to the preferred embodiment implies a considerably greater reduction in energy consumption than has hitherto been possible.

The handsets 2 have round-the-clock possibility to gain access to a speech channel 8 if the need exists. That user who has been inactive during the longest period of time is "shoved out" as speaking user and thereafter has only access to the outgoing channels 9a and 9b, until such time as the user wishes to speak again.

The system, i.e. the base unit 1, handles the distribution of the incoming speech channels 8 automatically, without the user needing to do more than signal an intention to speak, either by pushing a button (Push-to-talk, PTT) or the like, or quite simply by beginning to talk (voice controlled talk function). The automatic handling of the talk channels and the constant eavesdropping of all other users heard on the summation channel 9a give all users the perception of constantly having access to both a listening channel and a talk channel, i.e. "full duplex".

The emergency channel 9a is common to all users of the base unit 1, but it is unidirectional traffic, which implies that the user only listens on this channel. In many cases, the emergency channel 9b is common to a plurality of base units 1 operating in parallel with one another. One precondition is that the base stations are positioned so close to one another that they can be synchronised, i.e. they must be within each other's range. The synchronisation of two base stations which are located within each other's range is rehearsed to be carried out automatically when the base stations establish contact with one another. The users of each respective base unit or station 1 are included in different groups and normally would not communicate with one another. The emergency channel 9a reaches all users simultaneously and is, therefore, suitable for urgent messages that must be distributed immediately, i.e. fire alarms, risk of explosion etc.

Finally, FIG. 3 shows an additional outgoing channel 9c which is a technical channel and is principally utilised as a "hand-over" channel, i.e. a channel that is utilised on hand-over of conversations when one user moves from the area of one first base unit or station 1 to the area of another base unit or station 1.

DESCRIPTION OF ALTERNATIVE EMBODIMENTS

In the foregoing, the present invention has been described with a number of ingoing channels 8 and a number of outgoing channels 9a, 9b and 9c respectively. The number of channels 8, 9a, 9b, 9c employed in both directions may naturally be varied. Correspondingly, it is also conceivable that the present invention be applied also to some other telephone standard than the DECT standard, which was mentioned by way of introduction.

Another method of resolving the allocation of channels to the users is to fully shut down each outgoing speech channel which is no longer used. Thus, all available outgoing speech channels are closed and when a new user wishes to speak, one of the available channels is activated. This variation of the present invention enjoys the advantage that speech channels which are not actually in use are completely shut down and, as a result, require no power. Nor is it necessary to use any algorithm to establish which user has been inactive longest and should therefore forfeit his channel. However, one drawback is that activation of the speech channel takes a certain time, typically of the order of magnitude of 0.5 to 2 s, which in some situations is perceived as being inconvenient.

A number of the incoming speech channels 8 may be reprogrammed so as instead to become outgoing channels. These additional outgoing channels are usable in the same manner as the above-described summation channel 9*a*. It will thereby be possible without departing from the scope of the present invention to establish subgroups which each have access to their summation channel on one and the same base unit or station.

The present invention may be modified without departing from the scope of the appended Claims.

What is claimed is:

1. A method for wireless, digital radio communication utilizing Digital Enhanced Cordless Telecommunications (DECT) standard on multiple channels between multiple users, comprising providing the multiple channels including at least one listen channel and a plurality of outgoing speech channels, wherein all users are permitted to listen on the at least one listen channel which is associated with a first base unit and each user is allocated an outgoing speech channel when such user initiates a speech transmission, provided that once every available outgoing speech channel has been allocated to a user, an additional user who initiates a speech transmission will be allocated the outgoing speech channel of the user who has been inactive for the longest time, and wherein the first base unit sum totals speech transmission signals received from transmitting users as a sum totaled signal and transmits the sum totaled signal on the at least one listen channel, and wherein the first base unit is automatically synchronized with other base units within its range whereby a listen channel common to the first base unit and the other base units is established such that the users of each base unit are permitted to listen to the common listen channel.

2. The method as claimed in claim 1, characterised in that emergency messages are transmitted on the common listen channel.

3. The method as claimed in claim 2, characterised in that the emergency messages on the common listen channel are transmitted from two or more stationary base units which are first synchronised with one another.

4. The method as claimed in claim 1, characterised in that the plurality of outgoing speech channels is fewer than or equal to the multiple users of the first base unit.

5. A communication system for wireless, digital radio communication utilizing Digital Enhanced Cordless Telecommunications (DECT) standard on multiple channels between multiple users characterised in that the system comprises at least one stationary base unit, multiple handsets, and multiple channels including at least one listen channel and a plurality of outgoing speech channels, wherein all users are permitted to listen on the at least one listen channel which is associated with one stationary base unit and each user is allocated an outgoing speech channel when such user initiates a speech transmission, provided that once every available outgoing speech channel has been allocated to a user, an additional user who initiates a speech transmission will be allocated the outgoing speech channel of the user who has been inactive for the longest time, and wherein the one stationary base unit sum totals speech transmission signals received from transmitting users as a sum totaled signal and transmits the sum totaled signal on the at least one listen channel, and wherein the one stationary base unit is automatically synchronized with other stationary base units within its range, such that a listen channel common to the one stationary base unit and the other stationary base units is established so that the users of each base unit are permitted to listen to the common listen channel.

6. The communication system as claimed in claim 5, characterised in that the system includes at least two stationary base units which synchronise with one another.

7. The communication system as claimed in claim 5, characterized in that at least one of the handsets has a voice control.

* * * * *